United States Patent
Iwasaki et al.

(10) Patent No.: US 9,624,895 B2
(45) Date of Patent: Apr. 18, 2017

(54) CONTROL DEVICE AND CONTROL METHOD FOR VEHICLE

(71) Applicants: Shinsuke Iwasaki, Nagoya (JP); Takahiro Araki, Nagoya (JP)

(72) Inventors: Shinsuke Iwasaki, Nagoya (JP); Takahiro Araki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 14/765,459

(22) PCT Filed: Feb. 18, 2014

(86) PCT No.: PCT/IB2014/000169
§ 371 (c)(1),
(2) Date: Aug. 3, 2015

(87) PCT Pub. No.: WO2014/128547
PCT Pub. Date: Aug. 28, 2014

(65) Prior Publication Data
US 2015/0361939 A1 Dec. 17, 2015

(30) Foreign Application Priority Data
Feb. 19, 2013 (JP) .................................. 2013-030223

(51) Int. Cl.
*F02N 11/08* (2006.01)
*B60H 1/00* (2006.01)
(Continued)

(52) U.S. Cl.
CPC ....... *F02N 11/084* (2013.01); *B60H 1/00764* (2013.01); *B60H 1/322* (2013.01);
(Continued)

(58) Field of Classification Search
CPC .. F02N 11/00; F02N 11/084; F02N 2200/101; F02N 2200/0801;
(Continued)

(56) References Cited

U.S. PATENT DOCUMENTS 6,817,330 B1 * 11/2004 Ogawa .................... B60H 1/04
123/179.4
8,656,889 B2 * 2/2014 Muta .................. B60H 1/00764
123/179.4
(Continued)

FOREIGN PATENT DOCUMENTS

CN 102084112 A 6/2011
JP 2011-189812 A 9/2011
(Continued)

*Primary Examiner* — Hai Huynh
(74) *Attorney, Agent, or Firm* — Oliff PLC

(57) ABSTRACT

A vehicle control device includes: a controller configured to adjust a temperature of an evaporator constituting an air conditioning system of the vehicle to a target temperature; the controller being configured to automatically stop an engine when a predetermined engine automatic stop condition is satisfied; the controller being configured to automatically start the engine when at least the temperature of the evaporator reaches a predetermined temperature or higher during automatic stop of the engine, and the predetermined temperature being higher than the target temperature; and the controller being configured to set the target temperature of the evaporator to be lower when a vehicle speed is low than that when the vehicle speed is high.

4 Claims, 3 Drawing Sheets

(51) Int. Cl.
  *B60H 1/32* (2006.01)
  *B60W 10/30* (2006.01)
  *B60W 30/18* (2012.01)
  *B60W 10/06* (2006.01)
  *F01P 9/02* (2006.01)
  *F02N 11/00* (2006.01)

(52) U.S. Cl.
  CPC ............ *B60W 10/06* (2013.01); *B60W 10/30* (2013.01); *B60W 30/18018* (2013.01); *F01P 9/02* (2013.01); *B60H 2001/328* (2013.01); *B60H 2001/3273* (2013.01); *B60W 2520/10* (2013.01); *F02N 11/00* (2013.01); *F02N 2200/022* (2013.01); *F02N 2200/0801* (2013.01); *F02N 2200/0804* (2013.01); *F02N 2200/101* (2013.01); *F02N 2200/102* (2013.01); *F02N 2200/122* (2013.01); *Y02T 10/48* (2013.01)

(58) Field of Classification Search
  CPC ....... F02N 2200/0804; F02N 2200/102; F02N 2200/122; F02N 2200/022; F01P 9/02; B60W 10/06; B60W 10/30; B60W 2520/10; B60H 1/00764; B60H 1/322; B60H 2001/328; B60H 2001/3273; Y02T 10/48
  USPC ...... 701/112, 113; 123/179.3, 179.4, 339.16, 123/339.17, 339.18
  See application file for complete search history.

(56) References Cited

U.S. PATENT DOCUMENTS

| 2004/0211381 | A1 | 10/2004 | Ogawa et al. |
| 2011/0118954 | A1 | 5/2011 | Muta |
| 2012/0136553 | A1 | 5/2012 | Takeuchi et al. |

FOREIGN PATENT DOCUMENTS

| JP | 2011-219026 A | 11/2011 |
| JP | 2012-132425 A | 7/2012 |

* cited by examiner

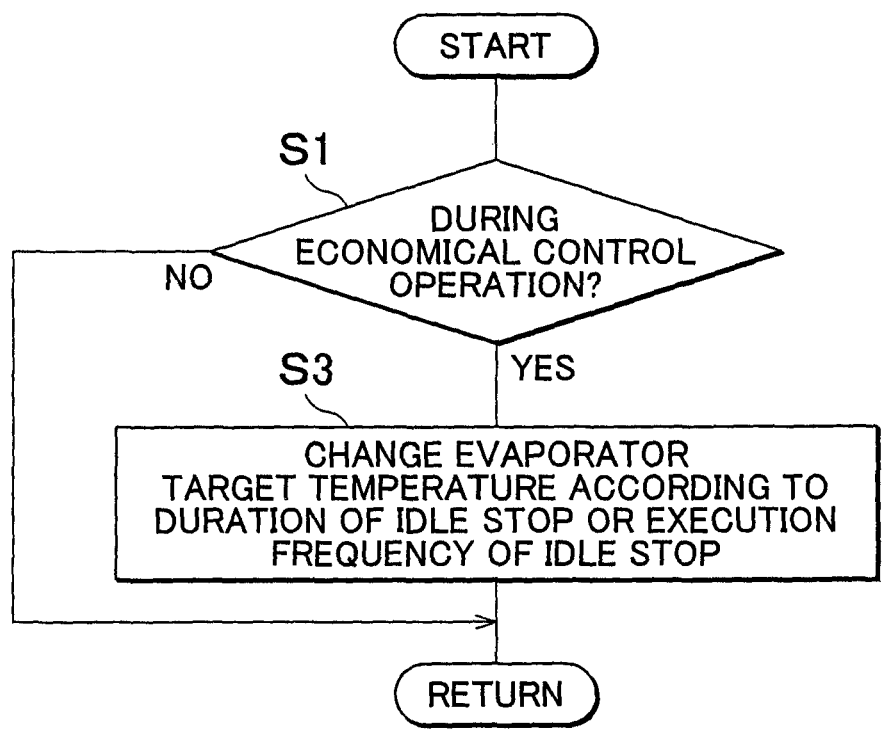

CONTROL DEVICE AND CONTROL METHOD FOR VEHICLE

BACKGROUND OF THE INVENTION

1. Field of the Invention

The present invention relates to a control device and a control method for a vehicle. More particularly, the present invention relates to control of a vehicle in which automatic stop and automatic start of an engine are carried out during traveling of the vehicle.

2. Description of Related Art

A so-called idle stop vehicle has been known in which an engine is automatically stopped on the basis of a predetermined automatic stop condition and the engine is automatically started on the basis of a predetermined automatic start condition during a stop of the vehicle. For example, a vehicle disclosed in Japanese Patent Application Publication No. 2011-219026 (JP 2011-219026 A) is one such example. In JP 2011-219026 A, an engine is automatically stopped on the basis that a vehicle speed is zero, that a battery and an engine water temperature are in predetermined states, that a brake pedal is depressed, or the like. In addition, it is described that the automatic start conditions include a temperature of an evaporator constituting an air conditioning system as one of the conditions and that, when the temperature of the evaporator becomes higher than a predetermined temperature, the engine is automatically started.

It has been suggested to execute the automatic stop and the automatic start of the engine not only during the stop of the vehicle but also during the traveling of the vehicle. In addition, economical control has been known in which a target temperature of the evaporator is temporarily increased for a purpose of improved fuel efficiency. When the economical control is executed in such a vehicle, the temperature of the evaporator is increased. If the engine is automatically stopped at this time, the evaporator reaches the predetermined temperature at which the engine is restarted in a short period. Accordingly, a period to stop the engine is reduced, and thus the fuel efficiency is possibly worsened.

SUMMARY OF THE INVENTION

The present invention provides a control device that can improve a fuel efficiency by increasing a stop period of an engine in a vehicle in which automatic stop and automatic start of the engine are carried out during traveling.

A control device for a vehicle according to a first aspect of the present invention includes: a controller configured to adjust a temperature of an evaporator constituting an air conditioning system of the vehicle to a target temperature; the controller being configured to automatically stop an engine when a predetermined engine automatic stop condition is satisfied; the controller being configured to automatically start the engine when at least the temperature of the evaporator reaches a predetermined temperature or higher during automatic stop of the engine, the predetermined temperature being higher than the target temperature; and the controller being configured to set the target temperature of the evaporator to be lower when a vehicle speed is low than that when the vehicle speed is high.

With such a configuration, because the target temperature of the evaporator is set lower when the vehicle speed is low than that when the vehicle speed is high, the temperature of the evaporator at which the engine is automatically stopped becomes low. Accordingly, a difference between the target temperature of the evaporator and the predetermined temperature thereof at which the engine is automatically started is increased, and thus a period required for the temperature of the evaporator to reach the predetermined temperature is increased. In other words, a period from the automatic stop of the engine to automatic restart thereof (idle stop period) is increased. Therefore, the engine stop period is increased, and thus fuel efficiency is improved. On the other hand, when the vehicle speed is high, the temperature of the evaporator at which the engine is automatically stopped is high. Meanwhile, when the vehicle speed is high, an increasing gradient of the temperature of the evaporator is gentle. Thus, like a case where the vehicle speed is low, the period from the automatic stop of the engine to the automatic restart thereof is increased.

A control device for a vehicle according to another aspect of the present invention includes: a controller configured to adjust a temperature of an evaporator constituting an air conditioning system of the vehicle to a target temperature; the controller being configured to automatically stop an engine when a predetermined engine automatic stop condition is satisfied; the controller being configured to automatically start the engine when at least the temperature of the evaporator reaches a predetermined temperature or higher during automatic, stop of the engine, the predetermined temperature being higher than the target temperature; the controller being configured to store a period from automatic stop of the engine to automatic start of the engine in a past, and the controller being configured to set the target temperature of the evaporator to be lower when the stored period is short than that when the stored period is long. A control device for a vehicle according to another aspect of the present invention includes: a controller configured to adjust a temperature of an evaporator constituting an air conditioning system of the vehicle to a target temperature; the controller being configured to automatically stop an engine when a predetermined engine automatic stop condition is satisfied; the controller being configured to automatically start the engine when at least the temperature of the evaporator reaches a predetermined temperature or higher during automatic stop of the engine, the predetermined temperature being higher than the target temperature; the controller being configured to, store a frequency of the automatic stop of the engine, and the controller being configured to set the target temperature of the evaporator to be lower when the stored frequency is low than that when the frequency is high. The control device stores a period from the automatic stop of the engine to the automatic start thereof in a past. When the stored period is short, the target temperature of the evaporator may be set lower than that when the stored period is long. In addition, the control device stores a frequency of the automatic stop of the engine. When the stored frequency is low, the target temperature of the evaporator may be set lower than that when the frequency is high. With such a configuration, when the period of automatic stop control in the past is short, or when an execution frequency of the automatic stop control is low, the target temperature of the evaporator is set low. Accordingly, the temperature of the evaporator is low when the engine is automatically stopped. Thus, the period for the temperature to reach the predetermined temperature at which the engine is automatically started is increased. Consequently, the period from the automatic stop of the engine to the automatic restart thereof is increased, and thus the fuel efficiency is improved.

A control method for a vehicle according to a second aspect of the present invention includes: adjusting a temperature of an evaporator constituting an air conditioning system of the vehicle to a target temperature; automatically stopping an engine when a predetermined engine automatic stop condition is satisfied; automatically starting the engine when at least the temperature of the evaporator reaches a predetermined temperature or higher as a predetermined engine automatic start condition is satisfied, the predetermined temperature being higher than the target temperature; and setting the target temperature of the evaporator to be lower when a vehicle speed is low than that when the vehicle speed is high.

BRIEF DESCRIPTION OF THE DRAWINGS

Features, advantages; and technical and industrial significance of exemplary embodiments of the invention will be described below with reference to the accompanying drawings, in which like numerals denote like elements, and wherein:

FIG. 4 is a flowchart for illustrating the control operation of the electronic control unit according to another embodiment of the present invention.

DETAILED DESCRIPTION OF EMBODIMENTS

A detailed description will hereinafter be made on embodiments of the present invention with reference to the accompanying drawings. It should be noted that the drawings are appropriately simplified or modified in the embodiment below and that a dimension ratio, a shape, and the like of each component are not necessarily depicted in a precise manner.

Figure 1:
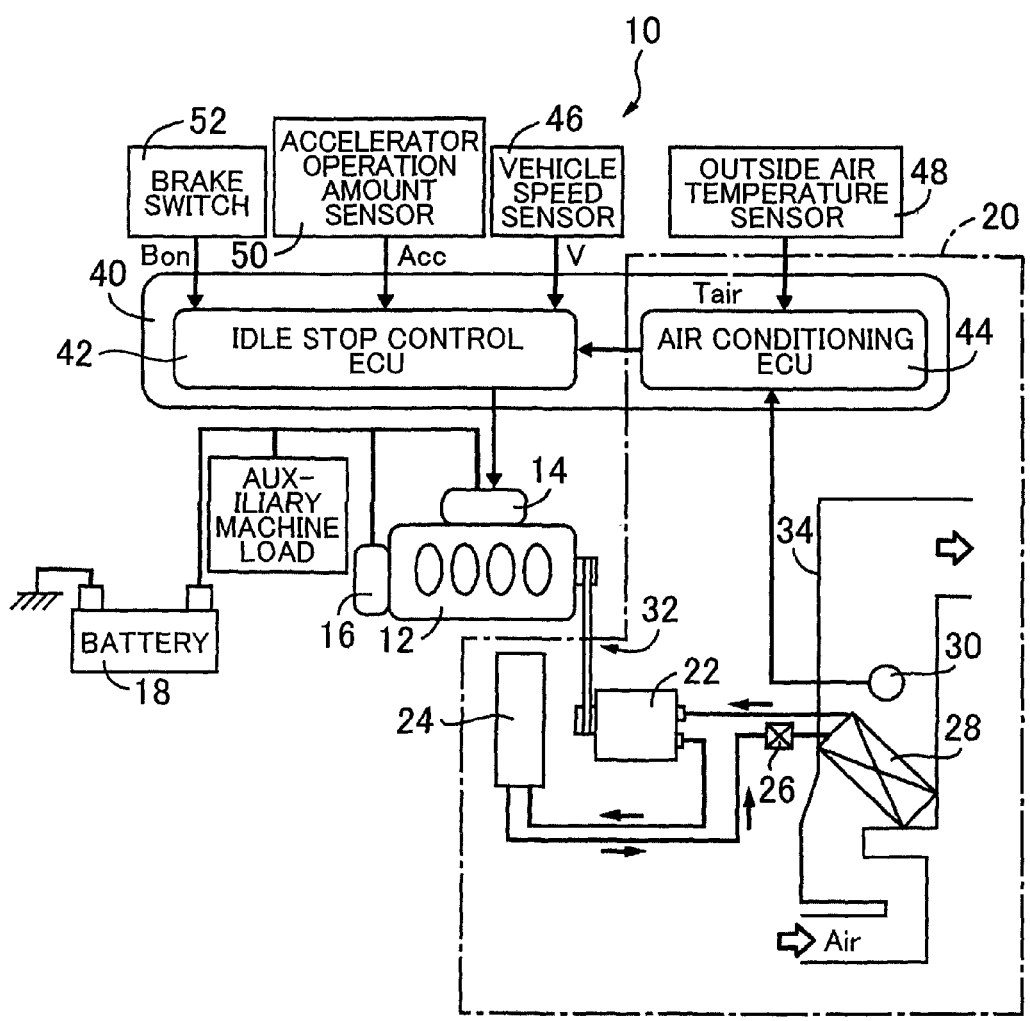
FIG. 1 is a schematic configuration diagram for showing a partial structure of a vehicle for which the present invention is adopted and primary components of a control system.

FIG. 1 is a schematic configuration diagram for showing a partial structure of a vehicle 10 for which the present invention is adopted and primary components of a control system. The vehicle 10 includes an engine 12 as a drive power source that is an internal combustion engine such as a gasoline engine, a diesel engine, or the like in which power is generated by combustion of a fuel. The drive power of the engine 12 is transmitted to drive wheels through an unillustrated transmission and the like.

The engine 12 includes various types of equipment such as an electronic throttle valve and a fuel injection device that are not shown but necessary for output control of the engine 12, a starter 14 for starting the engine 12, an alternator 16 that is driven by the engine 12 and functions as a generator, and the like. The electronic throttle valve controls an intake air amount. The fuel injection device controls a feed rate of the fuel. Basically, the fuel injection device is controlled according to an accelerator pedal operation amount (accelerator operation amount) Acc that is an output requested amount by a driver. In addition, the starter 14 is driven during start of the engine and rotates a crankshaft of the engine 12 to increase a rotational speed Ne of the engine 12 (engine rotational speed Ne). The starter 14 is driven by electric power from a battery 18. The alternator 16 is a generator that is driven by the engine 12. The generated electric power is charged in the battery 18.

In the engine 12, an engine automatic stop condition is satisfied when the accelerator operation amount Acc is zero or the like regardless of whether the vehicle is stopped or is traveling. Then, supply of the fuel is stopped (fuel cut F/C), and automatic stop control for automatically stopping the engine 12 is executed. In addition, if an automatic start condition for starting the engine 12 is satisfied during automatic stop of the engine 12, engine automatic start control for starting the engine by the starter 14 is executed.

An air conditioning unit 20 includes a compressor 22, a condenser 24, an expansion valve 26 (hereinafter described as valve 26), an evaporator 28, and an evaporator temperature sensor 30. It should be noted that the air conditioning unit 20 corresponds to the air conditioning system of the present invention.

The compressor 22 is operationally connected to the engine 12 through a pulley 32. Accordingly, when the engine 12 is driven, the compressor 22 is driven in an interlocking manner. When the compressor 22 is driven, a refrigerant gas that is housed in the air conditioning unit is suctioned and compressed, and the refrigerant gas that has reached a high temperature and a high pressure is discharged to the condenser 24.

The condenser 24 cools and liquefies the refrigerant gas that is discharged from the compressor 22. More specifically, the condenser 24 uses a traveling wind during traveling to, cool the refrigerant gas and converts it to a liquid refrigerant.

The valve 26 rapidly expands the liquid refrigerant that has been liquefied by the condenser 24 and converts it to a misty refrigerant (liquid refrigerant) at a low temperature and a low pressure. Thus, the misty refrigerant at the low temperature and the low pressure is supplied to the evaporator 28.

The evaporator 28 is provided in a duct 34 and absorbs heat of the air that flows through the duct 34 to cool the air. The thus-cooled air flows through the duct 34 and is supplied to a vehicle cabin, thereby cooling the vehicle cabin. At this time, the misty refrigerant in the evaporator 28 turns into a gaseous refrigerant at the low temperature and the low pressure by absorbing the heat and flows back into the compressor 22. As described above, the vehicle cabin is cooled by circulating the refrigerant and repeating gasification and liquefaction of the refrigerant in the air conditioning unit 20.

The evaporator temperature sensor 30 is provided in the duct 34 on a downstream side of the evaporator 28. The evaporator temperature sensor 30 detects a temperature on the downstream side of the evaporator 28 to presumptively detect a temperature Teva of the evaporator 28.

The vehicle 10 includes an electronic control unit 40 that controls the engine 12 and the air conditioning unit 20. The electronic control unit 40 includes a so-called microcomputer having a CPU, a ROM, a RAM, an input/output interface, and the like. The electronic control unit 40 uses a temporary memory function of the RAM to process a signal according to a program that is stored in advance in the ROM. In addition, the electronic control unit 40 separately includes an idle stop control ECU 42 (hereinafter engine ECU 42) that controls the start and stop of the engine 12 and an air conditioning ECU 44 that controls the air conditioning unit 20. It should be noted that the engine ECU 42 and the air conditioning ECU 44 may be formed of a single ECU.

The electronic control unit 40 is supplied with a signal indicative of a vehicle speed V from a vehicle speed sensor 46. The electronic control unit 40 is supplied with a signal indicative of an outside temperature Tair from an outside air temperature sensor 48. The electronic control unit 40 is supplied with a signal indicative of the accelerator operation amount Acc that is the accelerator pedal operation amount from an accelerator operation amount sensor 50. The electronic control unit 40 is supplied with a signal (Bon) indicative of the depression of the brake pedal from a brake switch 52. In addition to the above, the electronic control unit 40 is supplied with various types of information that are necessary for various types of control.

Figure 2:
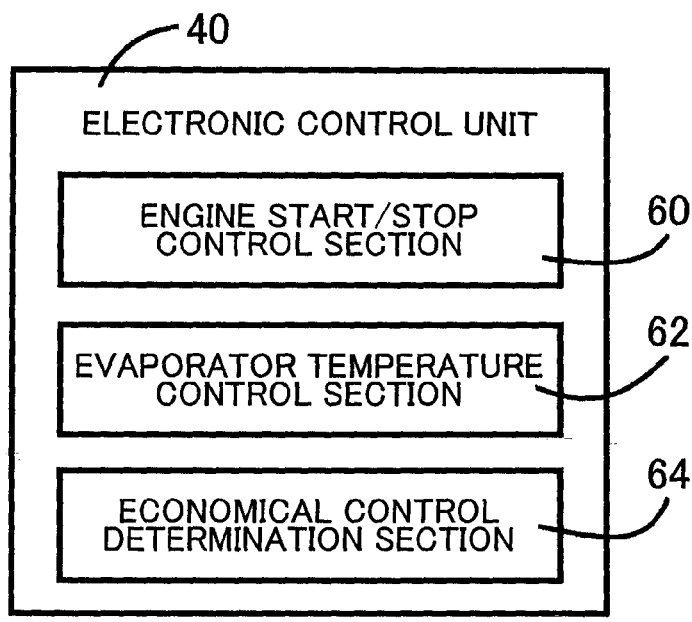
FIG. 2 is a functional block diagram for illustrating primary components in an electronic control unit of FIG. 1 that have control functions according to the present invention.

FIG. 2 is a functional block diagram for illustrating primary components of the electronic control unit 40 that have control functions according to the present invention. An engine start/stop control section 60 executes the automatic stop control for automatically stopping the engine 12 when a predetermined engine automatic stop condition is satisfied. The engine start/stop control section 60 also executes automatic start control for automatically starting the engine 12 when a predetermined automatic start condition is satisfied during the stop of the engine. It should be noted that, because the automatic stop control and the automatic start control of the engine 12 are the same as conventional engine stop control and conventional engine start control, the specific description thereof will be omitted.

The engine start/stop control section 60 determines the automatic stop of the engine 12 on the basis of the accelerator operation amount Acc, an ON signal of the brake switch 52 that determines the depression of the brake pedal, or the like, for example. The engine start/stop control section 60 determines that the automatic stop condition of the engine 12 is satisfied, for example, when the depression of an accelerator pedal is canceled (the accelerator operation amount Acc is zero) and the brake switch 52 is ON, and executes the automatic stop control for automatically stopping the engine 12. It should be noted that the automatic stop condition of the engine 12 is one aspect of the predetermined automatic stop condition according to the present invention and may appropriately be changed.

The engine start/stop control section 60 executes the automatic start control for automatically starting the engine 12 when the predetermined automatic start condition is satisfied during the stop of the engine 12. For example, when the depression of the brake pedal is canceled, and the depression of the accelerator pedal is detected, the engine start/stop control section 60 determines that the automatic start condition of the engine 12 is satisfied and executes the automatic start control of the engine 12.

In addition, when detecting that the temperature Teva of the evaporator 28 that constitutes the air conditioning unit 20 becomes a predetermined temperature Tev1 or higher, the engine start/stop control section 60 determines that the automatic start condition of the engine 12 is satisfied and executes the automatic start control of the engine 12. When the engine 12 is automatically stopped, the compressor 22 in the air conditioning unit 20 stops operating, and thus the air conditioning unit 20 also stops operating. Consequently, the temperature Teva of the evaporator 28 is increased, causing degradation of cooling performance and dehumidifying performance. Thus, when the temperature Teva of the evaporator exceeds the predetermined temperature Tev1, the engine start/stop control section 60 executes the engine automatic start control for a purpose of starting the air conditioning unit 20. It should be noted that the predetermined temperature Tev1 is experientially calculated in advance and set to a threshold within a range where the cooling performance is maintained, for example.

An evaporator temperature control section 62 controls (adjusts) the temperature Teva of the evaporator 28 during the operation of the air conditioning unit 20. More specifically, the evaporator temperature control section 62 sets a target temperature Tevr of the evaporator 28 and controls the air conditioning unit 20 such that the temperature Teva of the evaporator becomes the target temperature Tevr. The target temperature Tevr is appropriately set according to a requested temperature by the driver. In addition, the vehicle 10 of this embodiment is configured such that the economical control for achieving fuel saving can be selected. For example, if the economical control is selected when the outside temperature Tair is within a temperature range that is set in advance, the evaporator temperature control section 62 sets, the target temperature Tevr of the evaporator 28 to be higher than that in a case where the economical control is not selected. It should be noted that the temperature range that is set in advance is experientially calculated in advance and is set in a temperature range where a load applied to the air conditioning unit 20 is low except a state that the outside temperature Tair is high or low. Here, the evaporator temperature control section 62 handles temperature adjustment control for adjusting the temperature of the evaporator according to the present invention.

If the automatic stop control of the engine 12 is carried out in a state that the economical control is selected, comfortability of the vehicle cabin is degraded. It is because the temperature Teva of the evaporator is higher than that in the case where the economical control is not selected. Furthermore, if the economical control is selected, the temperature Teva of the evaporator at which the engine 12 is automatically stopped is high. Accordingly, the temperature Teva of the evaporator is increased, and a period to reach the predetermined temperature Tev1 that is used to determine the automatic start of the engine 12 is shorter than that when the economical control is not selected. Consequently, duration of the engine stop (idle stop period) is reduced.

Thus, the evaporator temperature control section 62 further changes the target temperature Tevr of the evaporator 28 according to the vehicle speed V of the vehicle 10. More specifically, when the vehicle speed V is low, the target temperature Tevr of the evaporator 28 is set lower than that in a case where the vehicle speed V is high. Under such control, the target temperature Tevr of the evaporator 28 is low when the vehicle speed V is low. Accordingly, the temperature Teva of the evaporator 28 is low when the engine 12 is automatically stopped. Therefore, the period required for the temperature Teva of the evaporator to reach the predetermined temperature Tev1 at which the engine 12 is automatically started is increased. In other words, the period from the automatic stop of the engine 12 to the automatic restart thereof (idle stop period) is increased.

On the other hand, when the vehicle speed V is high, the target temperature Tevr of the evaporator 28 is set high. Accordingly, the temperature Teva of the evaporator at which the engine 12 is automatically stopped is higher than that in the case where the vehicle speed V is low. Therefore, a difference between the temperature Teva of the evaporator immediately after the automatic stop of the engine and the predetermined temperature Tev1 is smaller than that in the case where the vehicle speed V is low. Meanwhile, when the vehicle speed V is high, an increasing gradient of the temperature Teva of the evaporator is less steep than that in the case where the vehicle speed V is low. Accordingly, the period required for the temperature Teva of the evaporator to reach the predetermined temperature Tev1 hardly differs from that in the case where the vehicle speed V is low.

Therefore, also when the vehicle speed V is high, the period from the automatic stop of the engine 12 to the automatic restart thereof (idle stop period) is increased like in the case where the vehicle speed V is low.

Returning to FIG. 2, an economical control determination section 64 determines whether or not the vehicle is traveling under the economical control. The economical control determination section 64 determines whether or not the vehicle is traveling under the economical control on the basis of whether or not an unillustrated economical switch button that is provided in a driver seat is pressed, for example. If it is determined by the economical control determination section 64 that the economical control has been selected; the evaporator temperature control section 62 changes the target temperature Tevr of the evaporator 28 according to the outside temperature Tair or the vehicle speed V.

Figure 3:
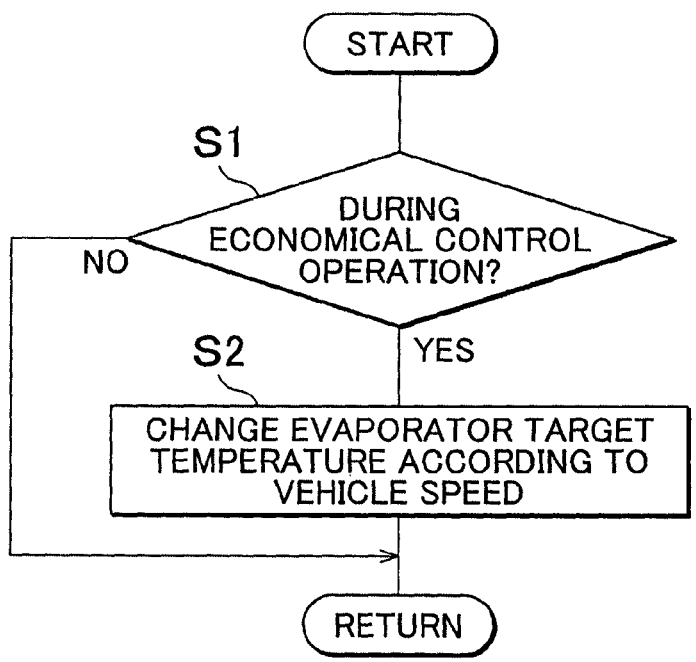
FIG. 3 is a flowchart for illustrating the primary components for a control operation of the electronic control unit, that is, the control operation in which a stop period of the engine is increased to improve a fuel efficiency when the engine is automatically stopped.

FIG. 3 is a flowchart for illustrating the primary components for a control operation of the electronic control unit 40, that is, the control operation in which the stop period of the engine is increased to improve the fuel efficiency when the engine 12 is automatically stopped. This flow is repeatedly carried out in an extremely short cycle time of several msec to tens of msec, for example.

In a step S1 (hereinafter the step is omitted) that corresponds to the economical control determination section 64, it is determined whether or not the vehicle is traveling under the economical control. If S1 is NO, this routine is terminated. If S1 is YES, the target temperature Tevr of the evaporator 28 is changed according to the vehicle speed V in S2 that corresponds to the evaporator temperature control section 62. More specifically, when the vehicle speed V is low, the target temperature Tevr of the evaporator 28 is set lower than that in the case where the vehicle speed V is high. Accordingly, when the vehicle speed V is low, for example, the temperature Teva of the evaporator 28 is controlled to be the target temperature Tevr, and the temperature Teva of the evaporator at which the engine 12 is automatically stopped is lower than that in the case where the vehicle speed V is high. Thus, the idle stop period from the automatic stop of the engine to the automatic start of the engine at which the temperature Teva of the evaporator reaches the predetermined temperature Tev1 is increased.

As described above, according to this embodiment, when the vehicle speed V is low, the target temperature Tevr of the evaporator 28 is set lower than that in the case where the vehicle speed V is high. Thus, the temperature Teva of the evaporator 28 at which the engine 12 is automatically stopped is low. This increases the difference between the temperature Teva of the evaporator and the predetermined temperature Tev1 at which the engine 12 is automatically started. Consequently, the period required for the temperature Teva of the evaporator 28 to reach the predetermined temperature Tev1 is increased. In other words, the period from the automatic stop of the engine 12 to the automatic restart thereof (idle stop period) is increased. Therefore, the engine stop period is increased, and thus the fuel efficiency is improved. On the other hand, when the vehicle speed V is high, the temperature Teva of the evaporator 28 at which the engine 12 is automatically stopped is high. Meanwhile, when the vehicle speed V is high, the increase gradient of the temperature Teva of the evaporator 28 is gentle. Accordingly, like the case where the vehicle speed V is low, the period from the automatic stop of the engine 12 to the automatic restart thereof is increased. Therefore, the engine stop period is increased, and thus the fuel efficiency is improved.

Next, another embodiment of the present invention will be described. It should be noted that the same components in the following description as those in the previous embodiment will be denoted by the same reference numerals and their description will not be repeated.

In this embodiment, the target temperature Tevr of the evaporator 28 is changed according to duration of the automatic stop control in the past (hereinafter, the idle stop period) or execution frequency of the automatic stop control. More specifically, when the idle stop period under the automatic stop control in the past is short, the evaporator temperature control section 62 sets the target temperature Tevr of the evaporator 28 to be lower than that in a case where the idle stop period is long. For example, the idle stop period is measured and stored every time the automatic stop of the engine 12 is carried out. Then, when the stored idle stop period in the past (for example, an average value obtained from the idle stop period of the past several times up to the latest idle stop period) is shorter than a predetermined period that is set in advance, the evaporator temperature control section 62 sets the target temperature Tevr to be low. Accordingly, when the idle stop period is short, the target temperature Tevr of the evaporator 28 is set low, and the temperature Teva of the evaporator is controlled to be the target temperature Tevr. Thus, the temperature Teva of the evaporator at which the engine 12 is automatically stopped for the next time becomes low. This increases the idle stop period from the automatic stop of the engine 12 to a period when the temperature Teva of the evaporator is increased to reach the predetermined temperature. Tev1. It should be noted that the predetermined period is experientially calculated in advance and set to an optimal value at which an effect of the fuel efficiency can be obtained.

When the execution frequency of the automatic stop control is low, the evaporator temperature control section 62 sets the target temperature Tevr of the evaporator 28 to be lower than that in a case where the execution frequency is high. For example, the number of execution of the automatic stop control from the present time back to a predetermined time that is set in advance is sequentially counted. When the number of execution is fewer than the predetermined number that is set in advance, the evaporator temperature control section 62 sets the target temperature Tevr of the evaporator 28 to be low. Accordingly, this increases the idle stop time from the automatic stop of the engine 12 to the period when the temperature Teva of the evaporator reaches the predetermined temperature Tev1. It should be noted that the predetermined number is experientially calculated in advance and set to an optimal value at which the effect of the fuel efficiency can be obtained.

FIG. 4 is a flowchart for illustrating the control operation of the electronic control unit 40 according to another embodiment of the present invention. First, in S1 that corresponds to the economical control determination section 64, it is determined whether or not the vehicle is traveling under the economical control. If S1 is NO, this routine is terminated. If S1 is YES, in S3 that corresponds to the evaporator temperature control section 62, the target temperature Tevr of the evaporator 28 is set low in a case where the duration of the automatic stop control (the idle stop period) is shorter than a predetermined duration. Alternatively, when the execution frequency of the automatic stop control is lower than the predetermined number, the target temperature Tevr of the evaporator 28 is set lower than that in the case where the execution frequency is high. With such control, because the temperature Teva of the evaporator at which the engine 12 is automatically stopped is lowered, the period required for the temperature Teva of the evaporator to reach the predetermined temperature Tev1, that is, the idle stop period is increased.

As described above, according to this embodiment, when the duration of the automatic stop control in the past is short, or when the execution frequency of the automatic stop control is low, the target temperature Tevr of the evaporator 28 is set low. At this time, the temperature Teva of the evaporator 28 at which the engine 12 is automatically stopped is low. Accordingly, the period required for the temperature Teva of the evaporator to reach the predetermined temperature Tev1 at which the engine 12 is automatically started is increased. Consequently, the period from the automatic stop of the engine to the automatic restart thereof is increased, and thus the fuel efficiency is improved.

The embodiments of the present invention work independently from each other and in combination. The description has been, made so far on the embodiments of the present invention with reference to the drawings. However, the present invention can also be adopted for other aspects.

For example, in the embodiment described above, it is determined that the automatic stop condition of the engine 12 is satisfied when the depression of the accelerator pedal is cancelled and the brake switch 52 is ON, for example. However, this is merely an example, and the automatic stop condition of the engine 12 is appropriately changed, for example, only to include the condition that the depression of the accelerator pedal is cancelled.

The specific structure of the vehicle 10 in the above-described embodiments is merely an example and can appropriately be changed by including the transmission and the like.

What has been described so far is merely one embodiment, and the present invention can be implemented in aspects after various modifications and improvements are made thereto based on the knowledge of those skilled in the art.

The invention claimed is:

1. A control device for a vehicle, comprising:
   a controller configured to adjust a temperature of an evaporator constituting an air conditioning system of the vehicle to a target temperature;
   the controller being configured to automatically stop an engine when a predetermined engine automatic stop condition is satisfied;
   the controller being configured to automatically start the engine when at least the temperature of the evaporator reaches a predetermined temperature or higher during automatic stop of the engine, the predetermined temperature being higher than the target temperature; and
   the controller being configured to set the target temperature of the evaporator to be lower when a vehicle speed is low than that when the vehicle speed is high.

2. The control device according to claim 1 wherein the controller stores a period from automatic stop of the engine to automatic start of the engine in a past, and
   the controller sets the target temperature of the evaporator to be lower when the stored period is short than that when the stored period is long.

3. The control device according to claim 1 wherein the controller stores a frequency of the automatic stop of the engine, and
   the controller sets the target temperature of the evaporator to be lower when the stored frequency is low than that when the frequency is high.

4. A control method for a vehicle, comprising:
   adjusting, by a controller, a temperature of an evaporator constituting an air conditioning system of the vehicle to a target temperature;
   automatically stopping, by the controller, an engine when a predetermined engine automatic stop condition is satisfied;
   automatically starting, by the controller, the engine when at least the temperature of the evaporator reaches a predetermined temperature or higher during automatic stop of the engine, the predetermined temperature being higher than the target temperature; and
   setting, by the controller, the target temperature of the evaporator to be lower when a vehicle speed is low than that when the vehicle speed is high.

* * * * *